(12) United States Patent
Eriksen et al.

(10) Patent No.: US 8,359,932 B2
(45) Date of Patent: Jan. 29, 2013

(54) SYSTEMS AND METHODS FOR MOUNTING LANDING GEAR STRAIN SENSORS

(75) Inventors: Odd Harald Steen Eriksen, Minneapolis, MN (US); Shuwen Guo, Burnsville, MN (US); Chuang-Chia Lin, Diamond Bar, CA (US); Lawrence Joseph Stang, Oakdale, MN (US)

(73) Assignee: Goodrich Corporation, Charlotte, NC (US)

( * ) Notice: Subject to any disclaimer, the term of this patent is extended or adjusted under 35 U.S.C. 154(b) by 282 days.

(21) Appl. No.: 12/839,170

(22) Filed: Jul. 19, 2010

(65) Prior Publication Data

US 2012/0011946 A1 Jan. 19, 2012

(51) Int. Cl.
*G01N 3/02* (2006.01)
(52) U.S. Cl. ............................................. 73/856; 73/780
(58) Field of Classification Search ..................... 73/760, 73/780, 856
See application file for complete search history.

(56) References Cited

U.S. PATENT DOCUMENTS

| | | |
|---|---|---|
| 2,968,031 A | 1/1961 | Higa |
| 3,783,496 A | 1/1974 | Siler |
| 4,269,070 A | 5/1981 | Nelson et al. |
| 4,312,042 A | 1/1982 | Bateman |
| 4,480,480 A | 11/1984 | Scott et al. |
| 4,651,402 A | 3/1987 | Bonfils |
| 4,850,552 A | 7/1989 | Darden et al. |
| 5,010,775 A | 4/1991 | Choisnet |
| 5,205,514 A | 4/1993 | Patzig et al. |
| 5,314,115 A | 5/1994 | Moucessian |
| 5,358,637 A | 10/1994 | Hutzler et al. |
| 5,446,666 A | 8/1995 | Bauer |
| 5,477,740 A | 12/1995 | Shioya et al. |
| 5,510,714 A * | 4/1996 | Takahashi et al. ............ 324/318 |
| 5,518,206 A | 5/1996 | Arnold et al. |
| 5,542,424 A * | 8/1996 | Hornak et al. ................ 600/517 |
| 5,815,091 A | 9/1998 | Dames et al. |
| 6,289,289 B1 | 9/2001 | Zweifel |
| 6,334,588 B1 | 1/2002 | Porte |
| 6,354,152 B1 | 3/2002 | Herlik |
| 6,676,075 B2 | 1/2004 | Cowan et al. |

(Continued)

FOREIGN PATENT DOCUMENTS

| DE | 3239877 A1 | 5/1984 |
|---|---|---|
| DE | 4035197 A1 | 1/1992 |

(Continued)

OTHER PUBLICATIONS

Extended Search Report issued Feb. 8, 2012 in connection with EP Application No. 11250852.8.

(Continued)

*Primary Examiner* — Max Noori
(74) *Attorney, Agent, or Firm* — Edwards Wildman Palmer LLP; Scott D. Wofsy; Joshua L. Jones

(57) ABSTRACT

A strain sensor device for measuring loads on aircraft landing gear. This is done by measuring strains in the lower end of the strut, by which we infer the loading in the entire landing gear structure. These strains can be very large (as high as 10,000 microstrain) and can be imposed in numerous random directions and levels. The present invention includes a removable sensor assembly. An electromechanical means is presented that can accommodate large strains, be firmly attached to the strut, and provide good accuracy and resolution.

17 Claims, 8 Drawing Sheets

U.S. PATENT DOCUMENTS

| | | | |
|---|---|---|---|
| 6,745,153 B2 | 6/2004 | White et al. | |
| 6,880,784 B1 | 4/2005 | Wilkinson et al. | |
| 6,902,136 B2 | 6/2005 | Mackness | |
| 6,951,145 B2 | 10/2005 | Kilmartin | |
| 6,955,097 B1 * | 10/2005 | Madni et al. | 73/862.337 |
| 6,959,497 B2 | 11/2005 | Leidinger | |
| 7,030,536 B2 * | 4/2006 | Smith et al. | 310/309 |
| 7,064,549 B1 * | 6/2006 | Hudson | 324/318 |
| 7,123,012 B2 * | 10/2006 | Srinivasan | 324/318 |
| 7,208,945 B2 | 4/2007 | Jones et al. | |
| 7,589,645 B2 | 9/2009 | Schmidt | |
| 7,680,630 B2 | 3/2010 | Schmidt | |
| 7,843,363 B2 | 11/2010 | Grichener et al. | |
| 2002/0199131 A1 | 12/2002 | Kocin | |
| 2003/0209063 A1 | 11/2003 | Adamson et al. | |
| 2004/0011596 A1 | 1/2004 | Miller et al. | |
| 2004/0012212 A1 | 1/2004 | Pratt et al. | |
| 2004/0075022 A1 | 4/2004 | MacKness | |
| 2004/0102918 A1 | 5/2004 | Stana | |
| 2004/0129834 A1 | 7/2004 | Luce | |
| 2004/0225474 A1 | 11/2004 | Goldfine et al. | |
| 2005/0030010 A1 | 2/2005 | Jones et al. | |
| 2006/0004499 A1 | 1/2006 | Trego et al. | |
| 2006/0038410 A1 | 2/2006 | Pratt et al. | |
| 2006/0107761 A1 * | 5/2006 | Meyer et al. | 73/862.044 |
| 2007/0006662 A1 | 1/2007 | Giazotto | |
| 2009/0173823 A1 | 7/2009 | Shetzer | |
| 2012/0011946 A1 | 1/2012 | Eriksen et al. | |
| 2012/0012700 A1 | 1/2012 | Eriksen et al. | |
| 2012/0012701 A1 | 1/2012 | Eriksen et al. | |
| 2012/0053784 A1 | 3/2012 | Schmidt et al. | |

FOREIGN PATENT DOCUMENTS

| | | |
|---|---|---|
| EP | 0072634 A1 | 2/1983 |
| EP | 1839984 A1 | 10/2007 |
| GB | 2226416 A | 6/1990 |
| SU | 1469339 A1 | 3/1989 |
| WO | WO-0212043 A1 | 2/2002 |
| WO | WO-2004013785 A2 | 2/2004 |
| WO | WO-2006067442 A1 | 6/2006 |

OTHER PUBLICATIONS

Extended Search Report issued Feb. 4, 2010 in connection with European Patent Application No. 05808070.6.

Office Action issued Feb. 3, 2012 in connection with U.S. Appl. No. 13/271,468.

Partial Search Report issued Nov. 2, 2011 in connection with European Patent Application No. 11250645.6.

Office Action issued Mar. 19, 2012 in connection with U.S. Appl. No. 12/839,401.

Extended Search Report issued Mar. 15, 2012 in connection with European Patent Application No. 11250645.6.

Partial Search Report issued Nov. 2, 2011 in connection with European Patent Application No. 11250647.2.

Extended Search Report issued Mar. 15, 2012 in connection with European Patent Application No. 11250647.2.

First Action Pre-Interview Communication issued May 30, 2012 in connection with U.S. Appl. No. 12/839,216.

* cited by examiner

SYSTEMS AND METHODS FOR MOUNTING LANDING GEAR STRAIN SENSORS

COPENDING APPLICATIONS

U.S. patent application Ser. Nos. 12/839,061 and 12/839,401 filed Jul. 19, 2010, which are hereby incorporated by reference.

BACKGROUND OF THE INVENTION

Aircraft landing gear, among other support devices, can experience strains that might lead to catastrophic failure. During landing, a landing gear strut can be deformed due to strain in different directions. Subjective determination of when landing gear should be inspected or replaced may be over- or under-reported, leading to unnecessary inspections or a missed opportunity to inspect.

Strain is defined as the amount of deformation per unit length of an object when a load is applied. Strain is calculated by dividing the total deformation of the original length by the original length (L):

$$\text{Strain}(e) = (\Delta L)/L$$

For a polysilicon piezoresistive type-element, the resistance is changed with load applied. When a strain is introduced, the strain sensitivity, which is also called the gauge factor (GF), is given by:

$$GF = \frac{\frac{\Delta R}{R}}{\frac{\Delta L}{L}} = \frac{\frac{\Delta R}{R}}{\text{Strain}}$$

The most popular strain gauges are metal foil elements on polyimide film. Piezoresistive silicon strain gauges have been developed that offer 100× improvement in gauge factor over metal foil elements. These are generally fashioned in the form of a Wheatstone bridge. The ideal strain gauge would change resistance only due to the deformations of the surface to which the gauge is attached. However, in real applications, temperature, material properties, the adhesive that bonds the gauge to the surface, and the stability of the metal all affect the detected resistance. Furthermore, the sensing range of usual strain gauges is limited by maximum stress capability of the sensing element. For example, the maximum strain limitation of these types of strain gauges is 3,000 microstrain. FIG. 1 shows fatigue limits on foil gauges. Even at 3,000 microstrain they will start to shift at less than 10,000 cycles. High strength steels can exceed 6,000 microstrain.

SUMMARY OF THE INVENTION

The present invention provides a monitor for measuring loads on aircraft landing gear. This is done by measuring strains in the lower end of the strut, from which we infer the loading in the entire landing gear structure. These strains can be very large (as high as 10,000 microstrain) and can be imposed in numerous random directions and levels. The present invention includes a removable sensor assembly. An electromechanical means is presented that can accommodate large strains, be firmly attached to the strut, and provide good accuracy and resolution.

BRIEF DESCRIPTION OF THE DRAWINGS

Preferred and alternative examples of the present invention are described in detail below with reference to the following drawings:

FIG. 5-1 is perspective cutaway view of the device of FIG. 3 attached to a landing gear assembly;

FIG. 5-2 illustrates an alternate embodiment for a ring/spline;

FIGS. 12-1 and 12-2 illustrate an exemplary system for determining force imbalances using one of the sensor devices of the other FIGURES.

DETAILED DESCRIPTION OF THE PREFERRED EMBODIMENT

Figure 2:
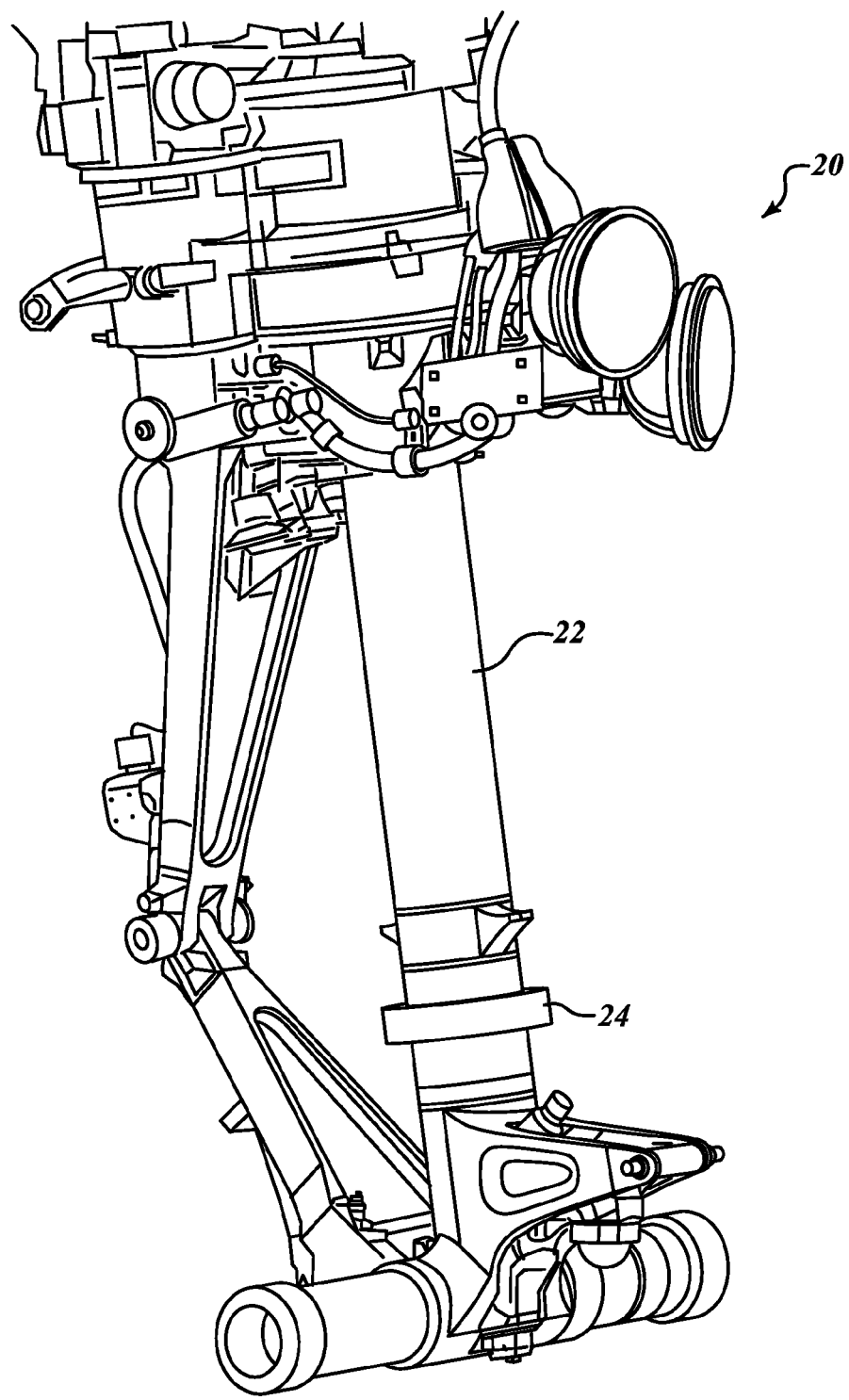
FIG. 2 is a perspective view of a landing gear assembly with a strain sensor device formed in accordance with the present invention.

FIG. 2 is a perspective view of a landing gear assembly 20 that includes a strut piston 22. A sensor ring assembly 24 is mounted to the strut piston 22. The sensor ring assembly 24 includes one or more sensors that provide signals of stress or strain experienced by the strut piston 22. Exemplary sensors are described in copending U.S. patent application Ser. Nos. 12/839,061 and 12/839,401 filed Jul. 19, 2010.

Figure 3:
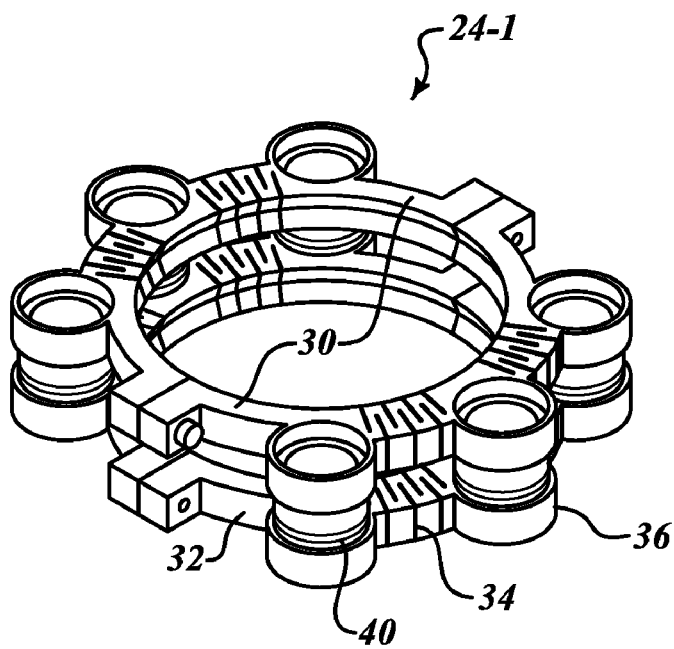
FIG. 3 is a perspective view of an exemplary strain sensor device.
Figure 4:
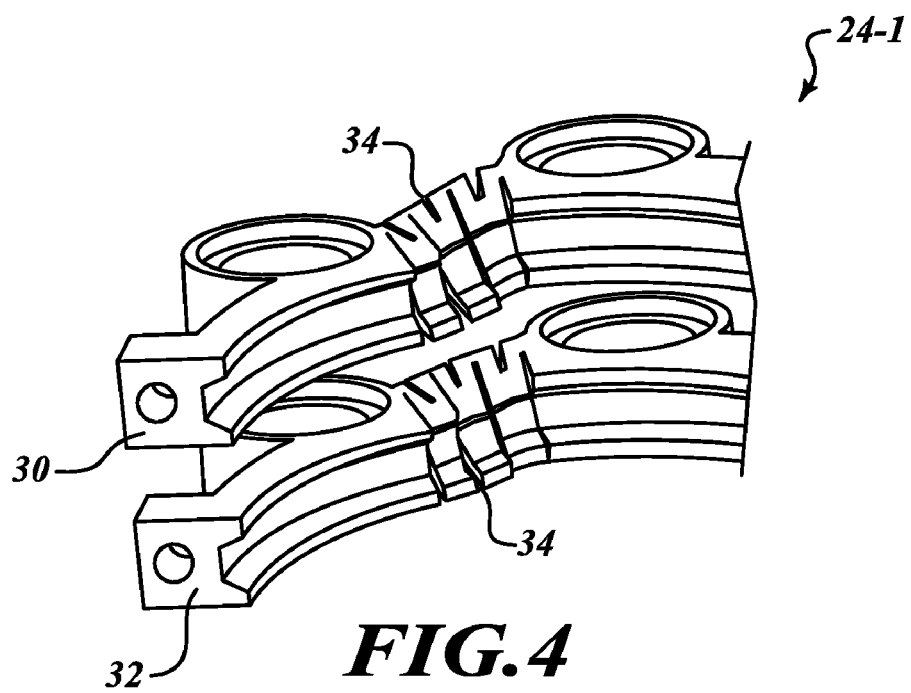
FIG. 4 is a partial perspective view of the device shown in FIG. 3.
Figures 1, 5:
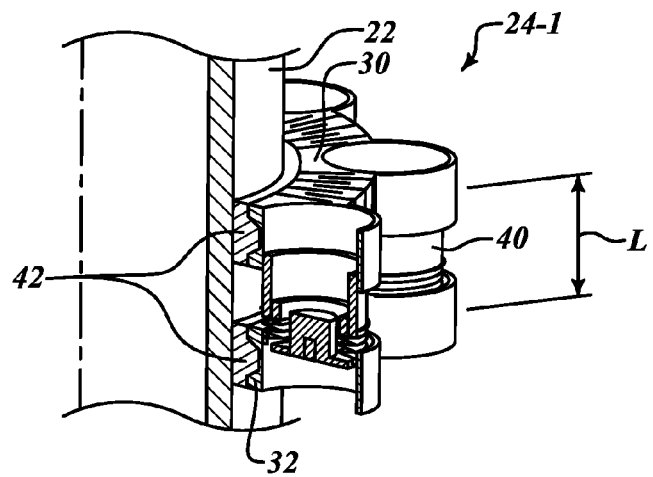
Figures 2, 5:
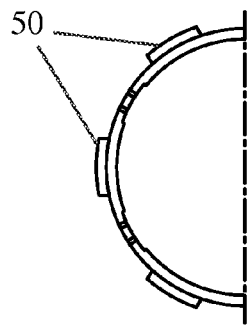

As shown in FIGS. 3-5, an exemplary sensor ring assembly 24-1 includes two independently mounted rings 30, 32 that are secured to respective guide/anchor rings/splines 42. Each of the two rings 30, 32 includes a pair of joined C sections (halves). The joined C sections form a complete ring encircling the landing gear strut piston 22. The anchor rings/splines 42 may be an integral feature (spline) machined into the structure (the strut piston 22) or attached as separate bonded rings where close diametral tolerances are held. In one embodiment, the anchor rings/splines 42 include a raised feature (mesa) that engages the rings 30, 32. The rings 30, 32 include a matching negative feature (groove), which mates securely with the raised feature. The rings 30, 32 include a groove matching the ring/spline 42 where the flanks of the groove and the ring/spline 42 have matching angles. Angled contact allows a wedging effect where minimal clamping load will be translated into higher anchoring forces. The anchor rings 42 are adhesively bonded to the lowest portion of the strut piston 22 where close diametral tolerances are held.

Ends of the C sections of each of the rings 30, 32 include flanges. The flanges are machined to allow a predefined clearance, thus allowing the bolts to draw the rings 30, 32 tight to the anchor ring/spline 42 with a specific torque that defines the force of engagement. The matching angle may be 30 degrees; other angles may be used, depending on the application. In another embodiment, a separate ring (not shown) is fabricated and bonded to the strut piston 22 according to a locating fixture to guarantee proper spacing.

In a further embodiment, the spline or ring 50 may be segmented as shown in FIG. 5-2 to allow for local engagement of individual sensors.

The sensor ring groove engages the segments in the same way as the complete spline described above. The segmentation is intended to localize the displacement input to the individual sensors. Isolation between the sensors provides accurate sensing of local strain under the sensor. The flexures in the sensor rings are intended for the same purpose. The wedging action into the groove is the same as the solid ring.

Each ring 30, 32 (upper and lower) secures one or the other end of one or more capacitive capsule sensors 40. The capsule sensors 40 are secured at one end to the upper ring 30 and at another end to the lower ring 32. Top and bottom ends of the capsule sensors 40 are connected to each other through a welded metal bellows, thereby allowing substantial deflection as the upper and lower rings 30, 32 move with respect to one another. Exemplary sensors 40 are described in copending U.S. patent application Ser. Nos. 12/839,061 and 12/839,401, which are hereby incorporated by reference.

The capsule sensor 40 is welded to the upper and lower rings 30, 32 or is machined from the same material (i.e., integral) as the rings 30, 32. Other attachment means may be used.

Landing gear struts are hydraulically damped as a shock absorber. In some landing gear struts the hydraulic fluid can extend into the region where the sensor rings are mounted. On heavy loading, the hydraulic pressure can generate large radial deformations. Preliminary modeling indicates that at least one such strut piston 22 sees radial swelling of several thousandths of an inch due to the hydraulic pressure in addition to the axial strains due to axial loading. These significant radial strains result in large Poisson strains in the axial direction. These Poisson strains will be "compressive" in the sense that the piston becomes shorter by 30% of the radial strain. This, plus the large axial load on the end of the strut piston 22 itself, results in a compounded contraction of the space between the two rings 30, 32.

The other strains induced in the system are bending strains. Bending of the strut piston 22 will induce compressive and tensile strains in the sides opposite each other. Hence, fore and aft sensors 40 (relative to the strain) in the assembly 24-1 will see a differential strain (expanding and contracting) due to fore and aft bending. Similarly, port and starboard sensors 40 (relative to the strain) will see differential strains due to sideways loading of the landing gear 20. The induced Poisson strains, as well as any imposed axial loading, affect all sensors identically (same sign). This axial strain becomes a common mode effect. This allows mathematical discrimination of sensor output due to axial strains and bending strains.

A rigid ring may be overstressed by the radial expansion of the strut. Also, there may be non-uniform strains around the strut which a rigid ring will not discriminate. For this reason a flexible member is introduced into the ring structure.

The radial strains are accommodated by serpentine flexures 34. The flexures 34 are stiff enough so that the rings 30, 32 remain seated on the strut piston 22 under high-G loads and shock loads but remain within the yield strength of the ring material. In other words, the serpentine flexures 34 allow radial expansion yet provide good stiffness in the other load directions. In one embodiment, the flexures 34 are fabricated using wire electric discharge machining (EDM), laser cutting, or waterjet cutting.

Stresses and strains are never totally uniform in a complex structure such as strut 22. If each sensor were rigidly connected to the next, the differences in strain would be eliminated due to the stiffness of the ring assembly 32. In the case of the segmented spline/ring as described in paragraph 0021, the anchoring feature would only engage the ring groove structure under each of the sensors allowing the intermediate segments between the flexures to move independently, minimizing crosstalk between the sensors. The serpentine flexures 34 provide 95% attenuation of crosstalk.

The serpentine flexures 34 include cutouts that have a large radius at the bottom of each cut, thereby reducing stress concentrations in the ring structure. The rings 30, 32 are fabricated from a corrosion-resistant and heat-treatable material, such as 17-4 or 15-5 PH stainless steel or any material with high strength and adequate corrosion resistance.

Figure 6:
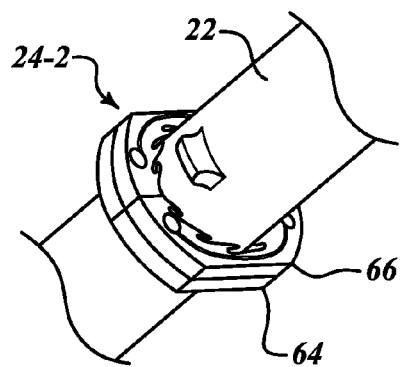
FIG. 6 is a perspective view of a strain sensor device formed in accordance with an alternate embodiment of the present invention.
Figure 7:
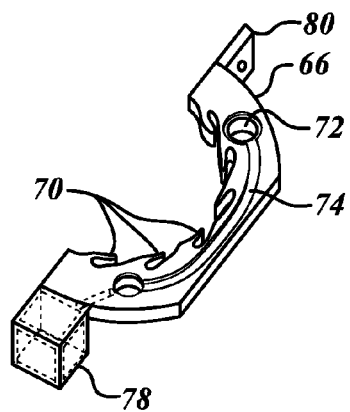
FIG. 7 is a partial view of the device of FIG. 6.

FIGS. 6 and 7 show an alternate ring assembly 24-2 that includes ring components 66 that include one or more cavities 72 in which a capsule sensor(s) (not shown) resides. Wires (not shown) are received within channels 74 in the ring components 66. The wires are routed to an electronics bay 78 located at an end of one of the ring components 66. The channels 74 and the cavities 72 are (hermetically) sealed by a cover 64 that is welded to the ring components 66. The cover 64 environmentally protects the channels 74 and cavities 72 in the ring components 66. The electronics bay 78 includes electronics necessary for conditioning signals from the capsule sensors. Such electronics may also include batteries, radio telemetry modules, and antennae for wireless communications.

The ring components 66 include flanges 80 that allow reception of securing devices, such as bolts, for connecting to another ring component 66 around the strut piston 22. An inner radius of the ring components 66 includes machined flexible cantilevered fingers 70. The radial strains are accommodated by the flexible cantilevered fingers 70 shown in FIG. 7. The fingers 70 are stiff enough so that the ring components 66 and the cover 64 remain seated on the strut piston 22 under high G loads and shock loads but remain within the yield strength of the ring material.

Figure 8:
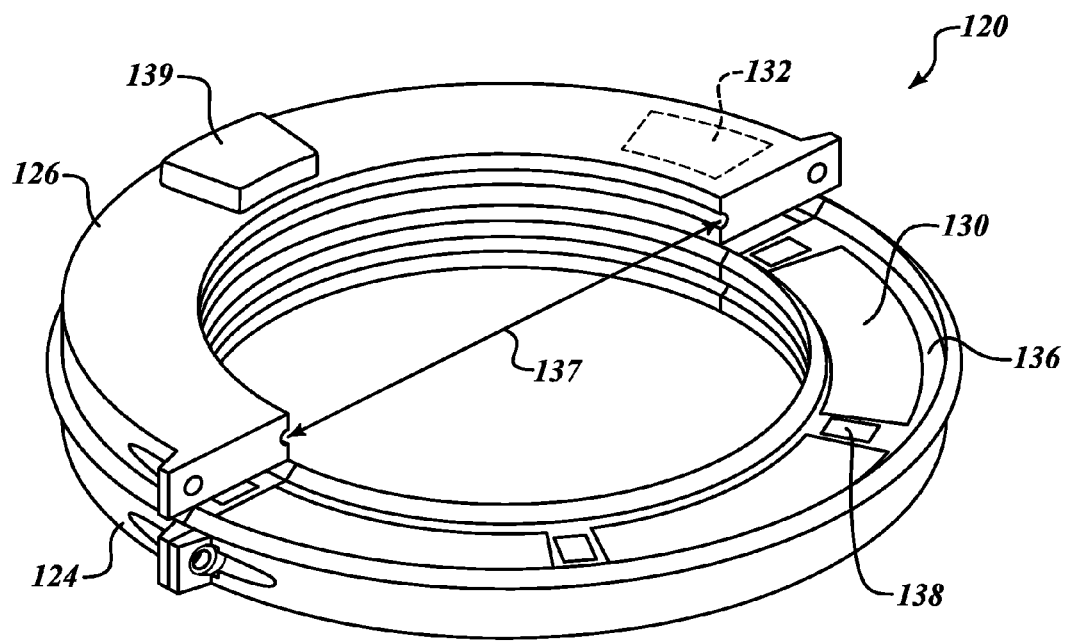
FIG. 8 is a partial perspective view of a strain sensor device formed in accordance with an alternate embodiment of the present invention.

FIG. 8 shows a capacitive strut ring sensor 120 formed in accordance with an alternate embodiment for measuring overload/hard landing of an aircraft. The capacitive strut sensor 120 includes two separated rings 124, 126 that can be attached to the bottom of the strut piston 22. Each ring 124, 126 has two C sections. Multiple capacitive plates 130, 132 (any number may be used) are placed around each ring 124, 126. The capacitive plates 130 in the lower ring 124 are radially aligned with capacitive plates 132 in the upper ring 126.

Under strain, the capacitance change of one side of the sensor 120 may be different from the capacitance change on the radially opposite side of the sensor 120. The differential output of the sensed capacitive changes provides information on the relative angular displacement of the two rings which result from differential strains on opposites sides of the strut 22. As in the previous embodiments, axial displacements of the strut will result in a common mode change in capacitance in all the capacitor plate pairs.

In one embodiment, the capacitive plates 130, 132 are uniformly distributed on an insulator plate 136 that may be integral to the ring body (e.g. sputter deposited on an insulating layer) or may be a separate planar element secured (e.g., epoxied) to the respective ring 124, 126. The capacitive plates 130, 132 are separated within a respective ring 124, 126 by a circuit component 138. The circuit component 138 is electrically connected to one or more of the capacitive plates 130, 132 and to an external communication component 139 via wires or electrical traces (not shown). The external communication component 139 is mounted to an exterior surface of one of the rings 124, 126. The external communication component 139 includes a wireless transmitter for sending and/or receiving signals and may include a device similar to those included in the electronics bay 78.

Figure 9:
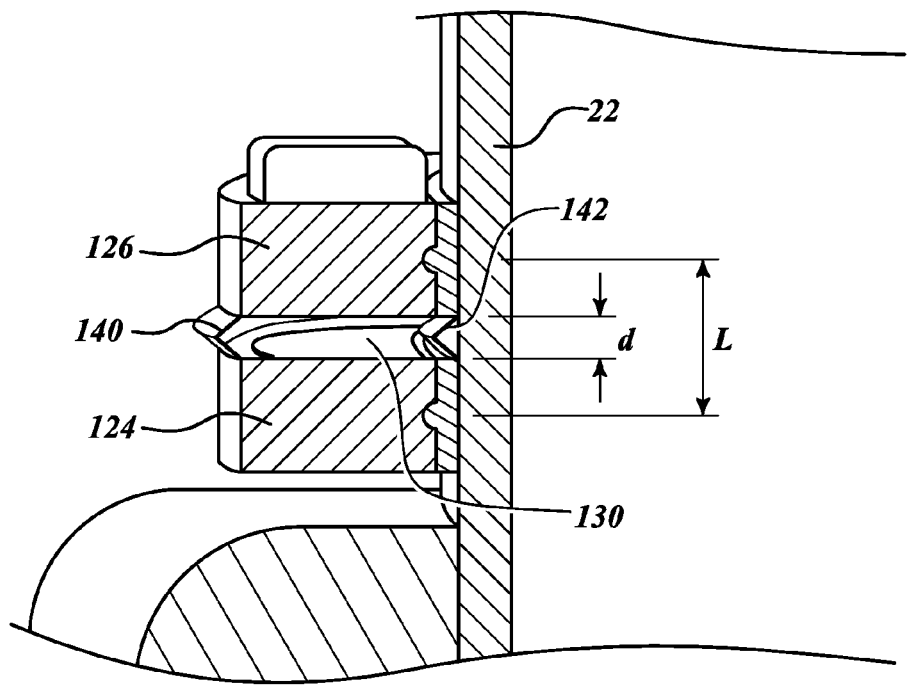
FIG. 9 is a cross-sectional view of the device of FIG. 8.

The rings 124, 126 are attached to the strut piston 22 by an adhesive or by a clamshell mounting device, such as that described in FIG. 5 above. FIG. 9 shows a cross-sectional view of the sensor 120. The distance between upper ring 126 and lower ring 124 is fixed. The upper ring 126 can be a piece of metal that acts as a ground plane. The readings from capacitive plates 130, 132 are relatively unaffected by a thermal mismatch between strut material and bonding material. Thermal deformation causes the capacitive plates 130, 132 to shift radially. This deformation should have minimum impact on capacitance value. The thermal expansion of the strut piston 22 in the axial direction will introduce a minor temperature coefficient of capacitance as the spacing between the rings 124, 126 changes with thermal expansion of the strut/piston material. This can be compensated by incorporating a temperature measurement device which provides a signal to the compensation circuitry.

The rings 124, 126 are connected with flexible seals 140, 142. The seals 140, 142 allow the rings 124, 126 to move, while keeping particulates from contaminating the capacitive gap.

Figure 1:
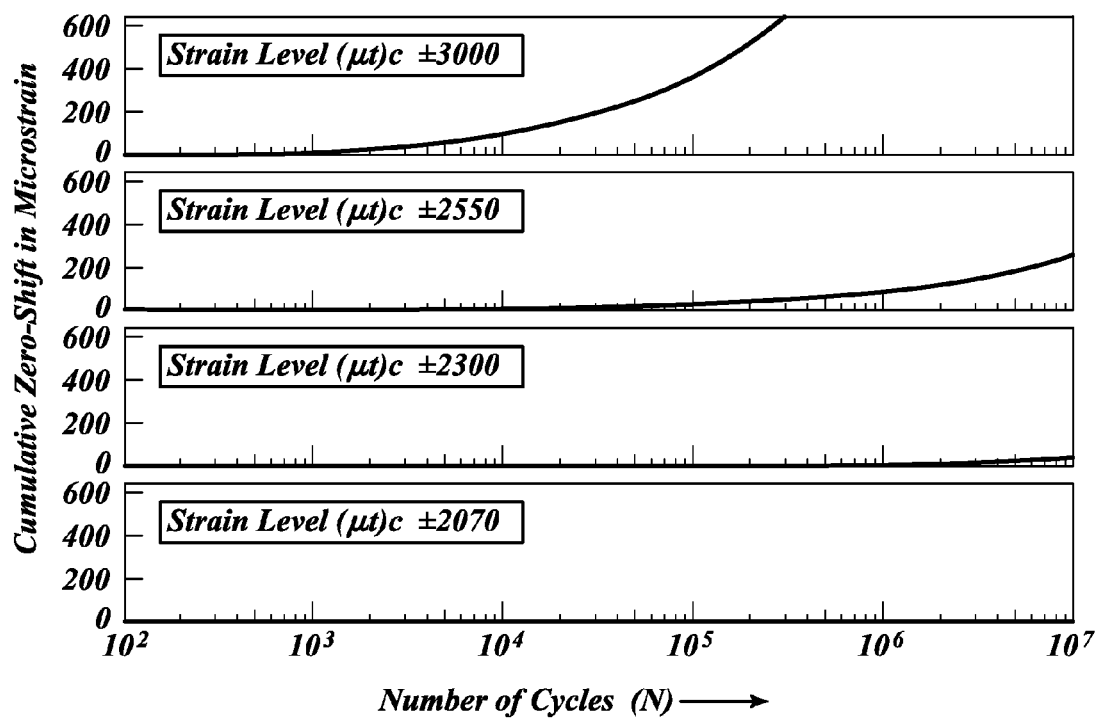
FIG. 1 is a graph showing results of some prior art.

In one embodiment, each ring 124, 126 includes two halves (C sections) that are bolted (or other means of fastening) together, placing the rings 124, 126 in radial compression over the strut (not shown). In one embodiment, a spline (not shown) or other type of protrusion such as the spline 42 shown in FIG. 5-1 are tangentially disposed around the strut. The spline mates with a matching cavity 137 for allowing positive anchoring of the rings 124, 126 to the strut.

Sensitivity of the sensor ring assemblies 24-1, 24-2 and 120 depends on the mounting distance (L) between the lower and upper rings 30, 32, 66, or 124, 126 and the initial gap (d) between the capacitive plates 130, 132 or the plates held within 40. If the gap (d) between capacitive plates is large, rest capacitance will be lower and changes in spacing will have less effect on capacitance value. If the gap is small, rest capacitance will be larger and changes in spacing will cause large changes in capacitance. If L is large, there will be more movement between the plates 130, 132 due to a larger ratio between L and d. The larger the L, the more output one can get. In one embodiment, the capacitance value of each capacitor should be within 1 pF to 10 pF or 2 pF to 250 pF when a particular commercially available capacitance-to-voltage converter application specific integrated circuit (ASIC) is used. The capacitance range can be extended to any range if using a specially designed circuit.

For the capacitive sensors and electronics employed, sensing resolution can be better than one microstrain and full-scale input range can be 10,000 microstrain. Accuracy is usually at least 10 times the resolution, and the system accuracy (composite of all sensors in the system) may be estimated at about 50 microstrain or 100 microstrain providing a percent accuracy of 0.5 to 1%.

Unlike foils train gages which conventionally are not useful beyond 3,000 microstrain, this design can sense strains well beyond 3,000 microstrain without fatigue of the sensing element. Strains of up to 6,600 microstrain, the usual fatigue limit of metals, and up to 10,000 micro-strain, the maximum ultimate strength of high strength materials, can be measured. The current embodiment is displaced by 0.010" at 10,000 microstrain. This displacement is dependent on the starting spacing of the splines. A 0.010" displacement over a 1" spline spacing is equivalent to 10,000 microstrain. A 0.5" spline spacing would displace 0.005" at 10,000 micro-strain and so forth. This tolerance of large strains is due to the flexible bellows in the sensor structure which are part of the overall ring assembly.

Figure 10:
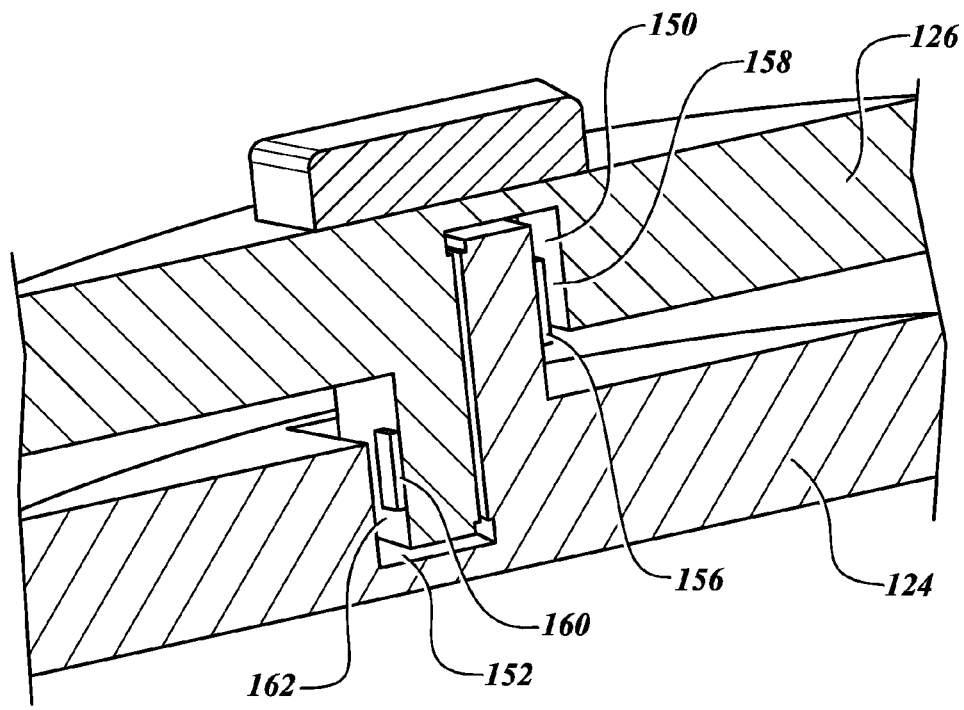
FIG. 10 is a side view of an alternate sensor included in the device of FIG. 3, 7, or 9.

Because a typical landing gear does not take any torsion in the lower portion of the strut piston 22, there may be other locations or other applications where torsional strain may be measured. However, there is interest in measuring side load on the strut which results in a lateral (port and starboard) shearing load on the piston. In order to measure side shear of the strut, either a sensor as disclosed in copending U.S. patent application Ser. No. 12/839,061 to lateral (perpendicular to the piston axis) is employed, as shown in FIG. 10. Shear loading is indicated by the arrow. A slot 150 is integrally cut into the upper ring 126 and capacitive electrode plate 156 is placed vertically on a protrusion that extends from the lower ring 124. A second capacitive electrode 158 is mounted on a wall of the slot 150 opposite the plate 156, thereby forming a capacitor. The lower ring 124 also includes a slot 152 for receiving a capacitive electrode 160 mounted on a protrusion from the upper ring 126. A capacitive electrode 162 is mounted to the wall within the slot 152 that is opposite the capacitive electrode 160. The capacitive electrodes 160, 162 are electrically isolated from the rings 126, 124 by being separately bonded to an insulating material or an insulating layer applied to the ring surfaces prior to metallization. Thus, two vertical capacitors are formed in the same axis on the each side of the strut. The capacitive electrodes 156, 160 are isolated from rings 126, 124. The rings 126, 124 are common or case ground. Or, there may be two isolated plates independently bonded to other gaps. When a lateral load occurs, one capacitance value will increase and the other value will decrease; therefore, a differential capacitive output is obtained. In this way, the twist deformation of the strut piston 22 will be accurately detected.

Figure 11:
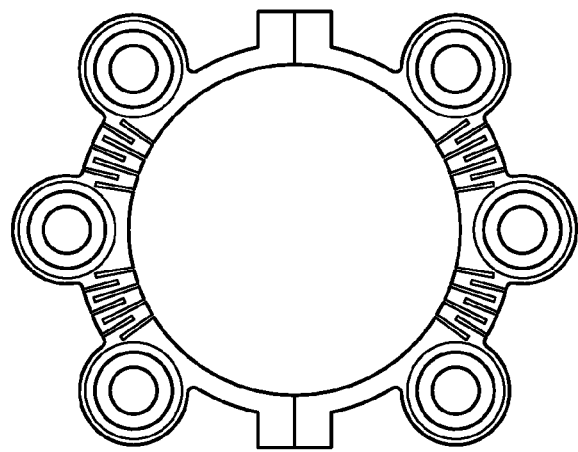
FIG. 11 is a schematic diagram showing exemplary sensor distribution for any of the devices shown in the previous FIGURES.

FIG. 11 shows an example of a sensor layout for use in any of the embodiments described above. Four sensors 200 are placed at the center of each quadrant, relative to aircraft orientation and one sensor 200 either fore or aft which serves as an additional reference as needed. The four sensors 200 detect bending in the strut 210 as the opposite sides of the strut 210 go into compression or tension. By calculating the resulting vector direction and amplitude, one can get a reading of maximum strain regardless of sensor orientation to the load. Vertical load on the strut 210 causes a common mode compression or tension on all five sensors 200. This can be mathematically calculated as well to get a reading of weight and balance. A shear sensor is placed in either the fore or aft position providing the lateral shear reading required.

Figures 1, 12:
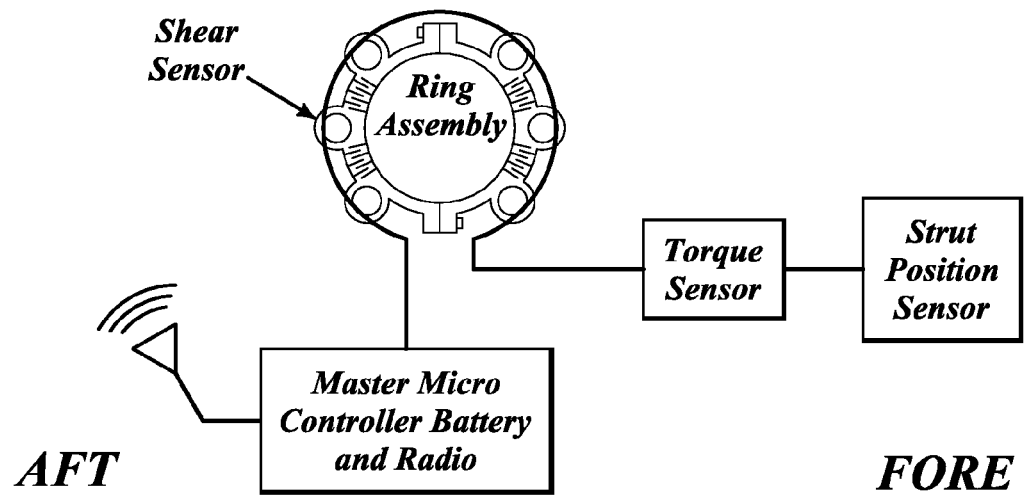
Figures 2, 12:
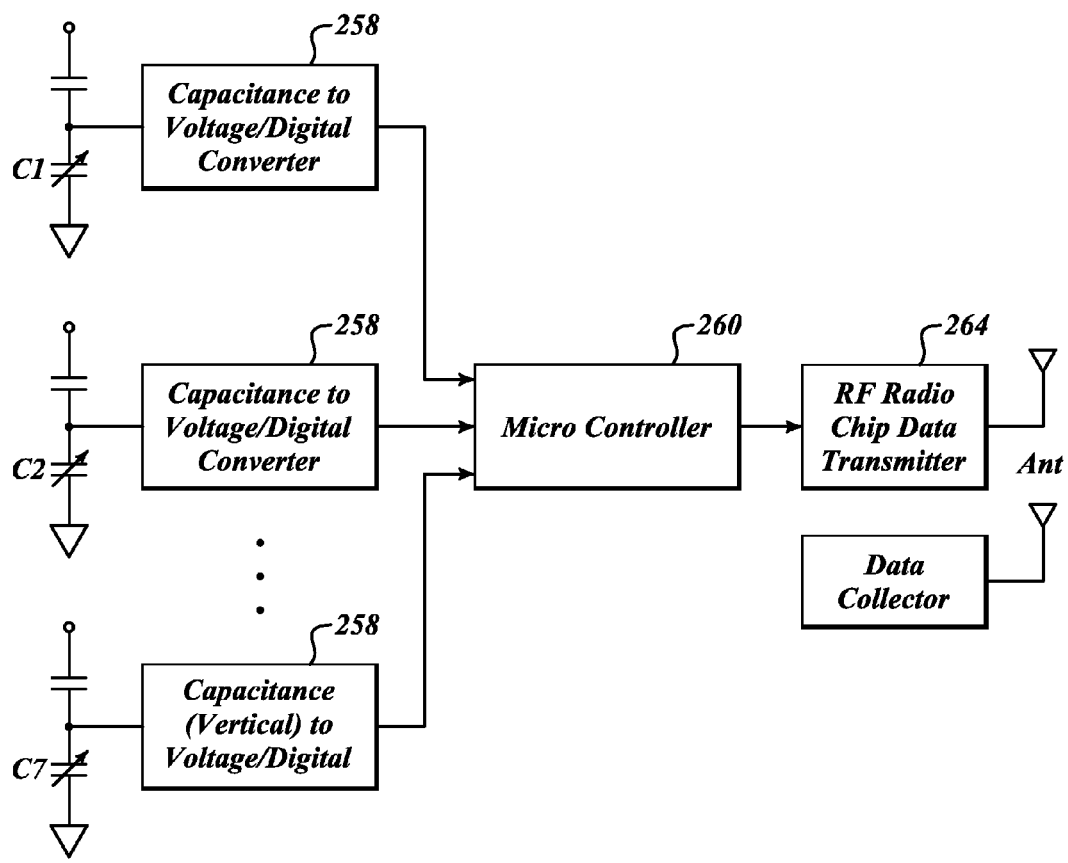

An overall capacitive strut sensor measurement system is shown in FIGS. 12-1 and 12-2. The five strain capacitors and the one lateral capacitor are connected to respective capacitance-to-voltage converters 258 (such as MS 3110 or AD 7746 or ZMD or any other equivalent circuit). FIG. 12-1 illustrates the various sensors in the system as an example of a serially connected system. The connections can also be parallel or be any convenient arrangement depending on proximity of the various sensors and the preferred cable routing. The block diagram FIG. 12-2 indicates voltage outputs of the converters 258 are sent to a microcontroller 260. The microcontroller 260 converts the analog signal into digital data. A software algorithm executed by the microcontroller 260 calculates the total load and imbalanced load, as well as twisting load. All of this load information is then sent to a receiving system which stores or further analyzes the data. An alternative embodiment may include a radio frequency (RF) chip 264 and an antenna and a remotely located data collector (RDC) which acts as the receiving system and storage device.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A device comprising:
    a ring assembly configured to mount to a structure, the ring assembly comprising:
        two rings;
        a mounting surface located on an inner surface of the two rings;
        a plurality of sensor mount locations on the two rings;
        a plurality of radial strain compensation devices on the two rings;
    two guide rings configured to mount to the structure and configured to be received by the mounting surface,
    wherein the sensor mount locations include a longitudinal axis that are perpendicular to a normal to the inner surface,
    wherein one of the sensor mount locations on a first of the two rings has the same longitudinal axis as one of the sensor mount locations on other ring.

2. The device of claim 1, wherein each of the two rings comprises two halves.

3. The device of claim 2, wherein each of the radial strain compensation devices is located between sensor mount locations.

4. The device of claim 3, wherein the plurality of radial strain compensation devices comprise one or more serpentine hinges.

5. The device of claim 2, wherein the plurality of radial strain compensation devices comprise one or more flexible fingers.

6. The device of claim 5, further comprising a housing configured to house electronics, the housing being attached to one of the rings.

7. The device of claim 2, further comprising one or more capacitive sensors configured to mount between the two rings at the sensor mount locations.

8. The device of claim 7, wherein the sensors are configured to sense greater than 3,000 microstrain of the structure or up to 10,000 microstrain.

9. The device of claim 8, wherein the sensors are configured to sense microstrain of the structure up to 10,000 microstrain.

10. The device of claim 2, further comprising a device configured to join the two halves of a first one of the rings and a device for joining the two halves of the other ring.

11. The device of claim 1, wherein the structure is a landing gear assembly.

12. A device configured to mount to a structure, the device comprising:
    a first ring comprising two portions with inner wall;
    a second ring comprising two portions with inner wall;
    a plurality of capacitive plates integral with the first and second rings, the capacitive plates being mounted to a surface that is approximately perpendicular to the inner walls,
    wherein the capacitive plates are electrically isolated from their respective rings.

13. The device of claim 12, further comprising:
    a mounting surface located between the inner walls and the structure.

14. The device of claim 12, wherein the structure is a landing gear assembly.

15. The device of claim 12, wherein the first ring comprises a cavity, a protrusion and an electrically isolated electrode and the second ring comprises a cavity, a protrusion and an electrically isolated electrode, wherein the protrusions extend away from the respective surface into the cavity of the opposing ring, wherein capacitive gaps with a dimension that is perpendicular to the surface are formed between each electrode and an opposing wall of the other ring.

16. The device of claim 12, wherein the device is configured to sense greater than 3,000 microstrain of the structure.

17. The device of claim 16, wherein the sensors are configured to sense microstrain of the structure up to 10,000 microstrain.

* * * * *

UNITED STATES PATENT AND TRADEMARK OFFICE
CERTIFICATE OF CORRECTION

PATENT NO.        : 8,359,932 B2
APPLICATION NO.   : 12/839170
DATED             : January 29, 2013
INVENTOR(S)       : Eriksen et al.

It is certified that error appears in the above-identified patent and that said Letters Patent is hereby corrected as shown below:

In the Claims:

Claim 1: At Column 7:
Line 12, "comprising" should be changed to --including--;
Line 13, ":" should be changed to --,--;
Line 14, "a mounting surface located on" should be changed to --each defining--;
Lines 14-15, delete "of the two rings";
Line 16, add --and-- at the end of the line;
Line 20, change "configured to be received by the mounting surface" to --couple to the inner surfaces of the two rings--;
Line 21, change "sensor mount locations include" to --inner surfaces of the two rings define--;
Lines 22-23, change "that are perpendicular to a normal to the inner surface" to --, and--;
Line 25, change "has the same longitudinal axis" to --and--;
Line 26, change "other ring" to --the other of the two rings are separated from one another in a direction generally parallel to the longitudinal axis--.

Claim 12: At Column 8:
Line 15, change "with" to --which define a first--;
Line 16, change "with" to --which define a second--;
Line 17, change "plurality" to --pair--;
Line 18, after "rings," add --respectively--;
Line 19, after "approximately perpendicular to the" add --first and second--;
Lines 21-22, change "wherein the capacitive plates are electrically isolated from their respective rings" to --wherein the first and second inner walls define a longitudinal axis, and the capacitive plates are separated from one another in a direction generally parallel to the longitudinal axis to form a capacitor, and are electrically isolated from their respective rings--.

Signed and Sealed this
Fourteenth Day of May, 2013

Teresa Stanek Rea
*Acting Director of the United States Patent and Trademark Office*